No. 622,923. Patented Apr. 11, 1899.
B. F. HUNTSBERRY & H. LAVEEN.
WHEEL TIRE.
(Application filed Oct. 4, 1897.)
(No Model.)
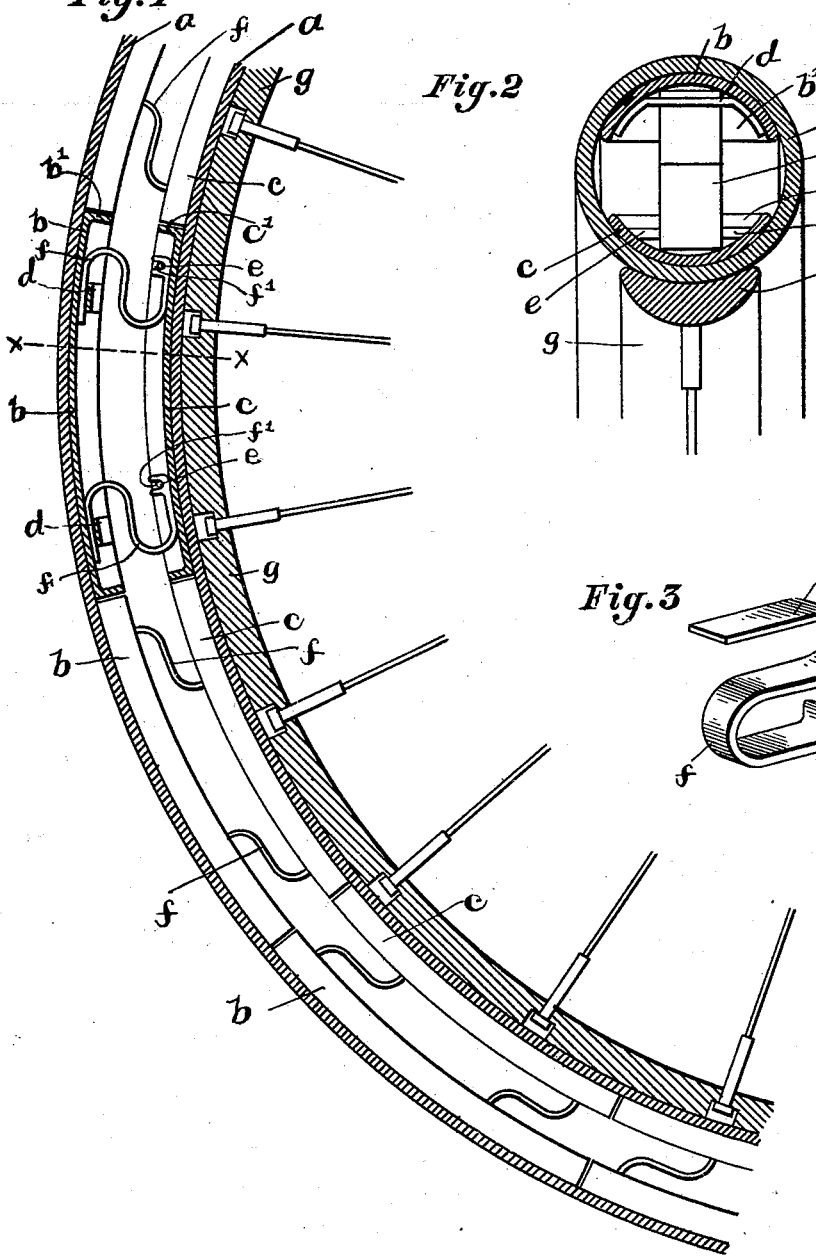
WITNESSES:
INVENTORS
Henry Laveen
Benjamin F. Huntsberry
BY
C. C. Shepherd
ATTORNEY

UNITED STATES PATENT OFFICE.

BENJAMIN F. HUNTSBERRY AND HENRY LAVEEN, OF COLUMBUS, OHIO.

WHEEL-TIRE.

SPECIFICATION forming part of Letters Patent No. 622,923, dated April 11, 1899.

Application filed October 4, 1897. Serial No. 653,920. (No model.)

*To all whom it may concern:*

Be it known that we, BENJAMIN F. HUNTSBERRY and HENRY LAVEEN, citizens of the United States, residing at Columbus, in the county of Franklin and State of Ohio, have invented a certain new and useful Improvement in Wheel-Tires, of which the following is a specification.

Our invention relates to the improvement of hollow tires for bicycle and other wheels; and the objects of our invention are to provide an improved tire of this class of such construction and arrangement of parts as to impart thereto the desired resiliency and at the same time obviate the necessity of inflating said tire, to so construct and arrange the parts of our improved tire as to obviate the tendency toward puncturing and to prevent the tire being rendered useless by punctures, to accomplish these objects without materially increasing the weight of the wheel on which the tire is used, and to produce other improvements in details of construction, which will be more fully pointed out hereinafter. These objects we accomplish in the manner illustrated in the accompanying drawings, in which—

Figure 1 is a central longitudinal section of a portion of a bicycle-wheel having our improved tire thereon, the inner or filling sections of the tire being shown in elevation, with the exception of one set, which is shown in section for the sake of clearness. Fig. 2 is an enlarged transverse section on line $x\,x$ of Fig. 1, and Fig. 3 is a detail view in perspective of one of the springs which we employ in the manner hereinafter described.

Similar letters refer to similar parts throughout the several views.

In carrying out our invention we employ a tubular tire $a$, which, although preferably of rubber, may be produced of other desirable flexible material.

$b$ and $c$ represent, respectively, inner and outer tire-filling sections which are curved to conform to the arc of the circle to be described by the inner surface of the tire. Each of these sections is of a concaved or curved form in cross-section, the ends thereof being closed or flanged inwardly, as indicated at $b'$ and $c'$. The sections $b$ and $c$ are of equal length, said outer section $b$ being provided at suitable points on opposite sides of the center of its length and on its inner surface with transverse keeper-bars $d$. The inner section $c$, which in the manner hereinafter described is separated from said section $b$, is provided on its inner surface at proper points with transverse pins $e$. The filling-sections of each pair thus formed are connected by means of springs $f$, which are preferably of the substantially S shape shown. The inner end of each of the springs $f$ is provided with a transverse recess or groove $f'$, these grooves being adapted to engage with cross-pins $e$ of the inner filling-section, while the outer ends of the springs are adapted to be inserted between the keeper-bars $d$ and the inner surface of said outer section. In this manner the sections of each pair are resiliently connected and separated one from the other. The pairs of filling-sections being thus connected, the same are adapted to be inserted one after the other into the tubular tire until said tire is filled, after which the ends of the tire may be closed and connected in the usual or any desirable manner. Owing to the fact that the exterior surfaces of the filling-sections conform to the curvature of the inner surface of the tire, it is obvious that said filling will serve to retain the tire-wall in a desirable distended position, thereby imparting to the tire the appearance which usually results from inflation. The tire thus produced may be secured to a bicycle or other wheel-rim $g$ in the usual manner.

It is obvious that coiled or other well-known forms of springs may be substituted for the S-shaped springs shown herein.

From the construction which we have described it will be seen that the weight of the body of the rider will be borne by the spring-connected filling-sections and that the springs which connect said sections will afford a desirable resilient bearing for the wheel. It is obvious that the weight of the rider and machine will be successively transferred to the spring-connected filling-sections and that the inward-springing movement of these sections will correspond substantially with the depression of an inflated tire. Owing to the fact that the filling-sections are formed of aluminium, it is obvious that a comparatively slight weight will be added to the tire by the use of said sections, and it will also be seen that a puncture or ordinary cut to which tires are subjected will in no way effect the utility of the same.

The construction of our improved tire is such as to admit of its being produced at a reasonable cost of manufacture.

Having now fully described our invention, what we claim, and desire to secure by Letters Patent, is—

In a bicycle-tire, the combination with a tubular tire-body of yielding material, of curved outer and inner filling-sections adapted to be inserted within said tire-body, said sections having inturned end flanges abutting against each other and substantially S-shaped spring-strips interposed between said sections and detachably connected with the latter, substantially as and for the purpose specified.

BENJAMIN F. HUNTSBERRY.
  HENRY LAVEEN.

In presence of—
 GEO. C. MITCHELL,
 P. S. KAISHNER.